United States Patent
Voice

(10) Patent No.: US 9,034,246 B2
(45) Date of Patent: May 19, 2015

(54) METHOD AND ASSEMBLY FOR FORMING A COMPONENT BY ISOSTATIC PRESSING

(75) Inventor: Wayne E. Voice, Nottingham (GB)

(73) Assignee: ROLLS-ROYCE plc, London (GB)

( * ) Notice: Subject to any disclaimer, the term of this patent is extended or adjusted under 35 U.S.C. 154(b) by 929 days.

(21) Appl. No.: 12/822,394

(22) Filed: Jun. 24, 2010

(65) Prior Publication Data

US 2011/0014082 A1    Jan. 20, 2011

(30) Foreign Application Priority Data

Jul. 15, 2009 (GB) .................................. 0912259.9

(51) Int. Cl.
| | |
|---|---|
| *B22F 3/04* | (2006.01) |
| *B22F 3/15* | (2006.01) |
| *B22F 3/12* | (2006.01) |
| *B30B 11/00* | (2006.01) |
| *C04B 35/645* | (2006.01) |
| *B28B 3/00* | (2006.01) |
| *B28B 3/02* | (2006.01) |

(52) U.S. Cl.
CPC ................. *B22F 3/15* (2013.01); *B22F 3/1208* (2013.01); *B22F 2003/153* (2013.01); *B28B 3/003* (2013.01); *B28B 3/025* (2013.01); *B30B 11/001* (2013.01); *C04B 35/6455* (2013.01); *C04B 2235/94* (2013.01); *F05B 2230/22* (2013.01); *F05B 2230/40* (2013.01)

(58) Field of Classification Search
CPC .... B22F 3/1208; B22F 3/15; B22F 2003/153; B30B 11/001; B28B 3/003
USPC .............................................. 419/68; 425/78
See application file for complete search history.

(56) References Cited

U.S. PATENT DOCUMENTS 4,486,385 A    12/1984  Aslund 4,673,549 A *  6/1987  Ecer ................................. 419/10

FOREIGN PATENT DOCUMENTS

| | | | |
|---|---|---|---|
| DE | 299 711 | A7 | 5/1992 |
| DE | 299711 | A7 * | 5/1992 |
| DE | 42 34 004 | C1 | 2/1994 |
| EP | 1 859 889 | A1 | 11/2007 |
| GB | 1 383 429 | | 2/1975 |
| JP | A 63-281809 | | 11/1988 |
| WO | WO 2007092363 | A2 * | 8/2007 |

OTHER PUBLICATIONS

Machine Translation of DD 299711, 1992.*
British Search Report issued in corresponding British Application No. GB 0912259.9, completed Aug. 20, 2009.
Extended Search Report in corresponding European Patent Application No. EP 10 16 7137 dated Nov. 5, 2010.

* cited by examiner

*Primary Examiner* — Rebecca Lee
(74) *Attorney, Agent, or Firm* — Oliff PLC

(57) ABSTRACT

A method of forming a component (30) by isostatic pressing, the method comprising: providing a canister (4) suitable for isostatic pressing, the canister comprising first and second membranes (14, 16) which, in use, are disposed within the canister (4); the first and second membranes (14, 16) defining a component cavity (24) disposed between the first and second membranes (14, 16), a first tool cavity (26) disposed between the first membrane (14) and an adjacent wall (10) of the canister (4), and a second tool cavity (28) disposed between the second membrane (16) and another adjacent wall (12) of the canister (4); filling the component cavity (24) with the component powder for forming the component (30); filling the first and second tool cavities (26, 28) with a second tool powder; and isostatically pressing the canister (4) to form the component (30).

11 Claims, 2 Drawing Sheets

METHOD AND ASSEMBLY FOR FORMING A COMPONENT BY ISOSTATIC PRESSING

This invention relates to a method of forming a component by isostatic pressing, and particularly but not exclusively relates to applications of the method to form components for turbomachines, and also to an assembly suitable for use in such a method.

BACKGROUND

In the aerospace industry, engine components, particularly engine casings, are conventionally formed by ring-roll forging. For example compressor casings are formed from titanium alloys, such as Ti 6Al4V (6-4), however other materials such as steel and nickel may be used in other parts of the engine.

Conventional ring-roll forged components are first forged to approximately the desired shape but must be heavily machined in order to achieve the final component. This final machining operation dramatically increases the cost per component due to the increased labour and reduced material utilisation.

It is desirable to form components that are net-shape or near net-shape in order to remove or reduce the final machining process and thus reduce the cost per component.

One method of producing net shape or near net-shape components is by using powder metallurgy. Powder metallurgy is where a powdered metal is consolidated by applying pressure and/or high temperatures over time to form a component.

There are various techniques known in the art for consolidating a powder, an example of which is isostatic pressing. Isostatic pressing differs from other powder metallurgy techniques in that the powder is compacted and consolidated without direct contact with the pressuring medium. This is achieved by placing the powder within a container, conventionally known as a canister, which acts as a barrier between the pressuring medium and the powder. The canister is typically evacuated and sealed and the powder out-gassed to avoid any contamination of the powder. The canister is deformed by the pressurising medium and thus transfers the pressure to the powder without direct contact. As a result of this configuration, isostatic pressing creates a uniform pressure on the powder which creates a consolidated component with a homogenous density.

Isostatic pressing can be categorised into two separate types: cold isostatic pressing (CIP) and hot isostatic pressing (HIP).

In CIP, the canister is typically made from a flexible material such as a rubber. The pressurising medium, usually a liquid, is applied at room temperature to compact the powder. The compacted powder must be subsequently sintered to bond the particles to one another.

HIP differs from CIP in that the powder is effectively compacted and sintered simultaneously by pressurising and also heating the powder. The canister is usually a metallic container although glass may be used, and the pressurising medium is a gas, typically an inert gas such as argon or helium. Due to the high temperatures, the canister plastically deforms under the applied pressure which is transferred to the powder thus consolidating the powder to form the component.

Following consolidation of the powder it is necessary to remove the canister from the component. This may be achieved by machining the canister from the component or by applying an acid solution to the canister. This additional processing increases the cost of the component and the waste acid solution is undesirable from an environmental point of view.

Furthermore, isostatic pressing techniques require complex computer modelling to determine the correct geometry for the canister and pre-isostatic pressing powder profile. This again increases the cost per component.

The present invention provides a method and assembly for isostatic pressing a net-shape or near net-shape component which addresses the above problems associated with conventional techniques.

STATEMENTS OF INVENTION

According to a first aspect of the invention, there is provided a method of forming a component by isostatic pressing, the method comprising: providing a canister suitable for isostatic pressing, the canister comprising first and second membranes which, in use, are disposed within the canister; the first and second membranes defining a component cavity disposed between the first and second membranes, a first tool cavity disposed between the first membrane and an adjacent wall of the canister, and a second tool cavity disposed between the second membrane and another adjacent wall of the canister; filling the component cavity with a component powder for forming the component; filling the first and second tool cavities with a second tool powder; and isostatically pressing the canister to form the component.

The tool powder may have a densification rate which is less than or approximately equal to the densification rate of the component powder The tool powder may have a densification rate which is less than or approximately equal to the densification rate of the component powder when under isostatic pressing conditions.

The densification rates may depend on the flow stresses of the powders, such that the tool powder may have a flow stress which is less than or approximately equal to the flow stress of the component powder.

The densification rates may depend on the yield strengths of the powders, such that the tool powder may have a yield strength which is less than or approximately equal to the yield strength of the component powder.

The method may further comprise evacuating and sealing the component cavity and first and second tool cavities prior to isostatically pressing.

Isostatically pressing the canister may comprise hot isostatically pressing.

The canister may be hot isostatically pressed at a temperature of approximately 750° C. and a pressure of approximately 150 MPa for approximately two hours.

The temperature may be subsequently raised to approximately 930° C. for approximately a further two hours.

Following isostatically pressing, the component powder may be consolidated to form the component and the tool powder is consolidated to form a first tool in the first tool cavity and a second tool in the second tool cavity, the method may further comprise removing the first and second tools and first and second membranes from the component.

The method may further comprise removing end portions of the canister, consolidated component and first and second tools.

Removing the end portions may allow the first and second tools and first and second membranes to be removed from the component.

The method may further comprise coating a surface of the first and second membranes to aid separation of the membranes from the component following isostatic pressing.

According to a another aspect of the invention, there is provided an assembly suitable for isostatically pressing a powder to form a component, the assembly comprising: a canister; and first and second membranes which, in use, are disposed within the canister; the first and second membranes defining a component cavity disposed between the first and second membranes, a first tool cavity disposed between the first membrane and an adjacent wall of the canister, and a second tool cavity disposed between the second membrane and another adjacent wall of the canister; wherein the component cavity receives a component powder for forming the component; and wherein the first and second tool cavities receive a tool powder.

The tool powder may have a densification rate which is less than or approximately equal to the densification rate of the component powder.

The tool powder may have a densification rate which is less than or approximately equal to the densification rate of the component powder when under isostatic pressing conditions.

The densification rates may depend on the flow stresses of the powders, such that the tool powder may have a flow stress which is less than or approximately equal to the flow stress of the component powder.

The densification rates may depend on the yield strengths of the powders, such that the tool powder may have a yield strength which is less than or approximately equal to the yield strength of the component powder.

The first and second membranes may be located within slots in the canister.

The first and second membranes may be provided with a coating to aid separation of the first and second membranes from the component following isostatically pressing. The coating may be a flash coating of Chromium.

The membrane may be a thin nickel plate and may be electroformed.

The component powder may comprise titanium and the tool powder may comprise steel.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
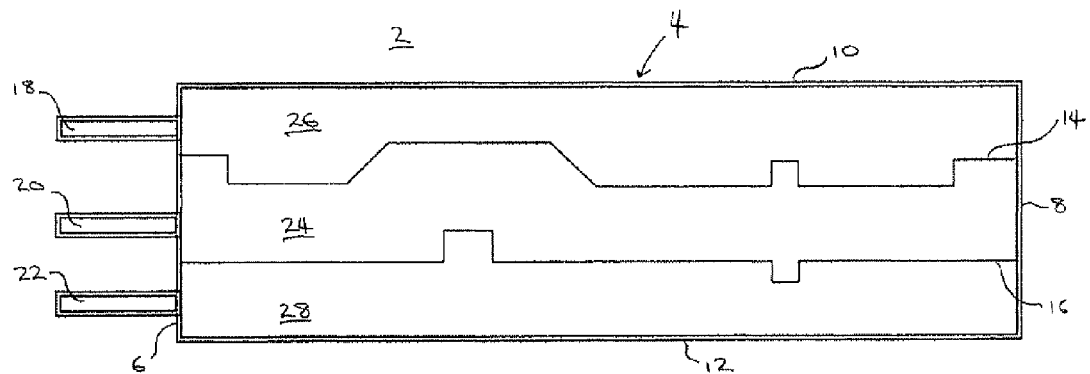
FIG. 1 is a side sectional-view of an assembly in accordance with an aspect of the invention, the assembly being in a first stage of an isostatic pressing method in accordance with a second aspect of the invention.

FIG. 1 shows an assembly 2 according to a first aspect of the invention. The assembly 2 comprises a canister 4, the canister 4 having a first side wall 6, a second side wall 8, a top wall 10 and a bottom wall 12. Additional end walls (not shown) are joined to the first and second side walls 6, 8 and top and bottom walls 10, 12 to define a substantially enclosed canister. Disposed within the canister 4 is a first membrane 14 and a second membrane 16. The first and second membranes have profiles which act as die surfaces in an isostatic pressing method, as will be described in detail below. The first and second membranes 14, 16 are preferably thin electroformed nickel plates.

The first and second membranes 14, 16 are retained inside the canister 4 by slots (not shown) formed in the first and second side walls 6, 8. Alternatively, the first and second membranes 14, 16 may be retained within the canister 4 using a guide channel which protrudes into the canister 4 from the first and second side walls 6, 8 or by integrally forming the first and second membranes as part of the canister 4. However, it should be understood that other means may be used which in operation prevent the first and second membranes 14, 16 from moving within the canister 4. The first and second membranes 14, 16 may be introduced into the canister 4 by removing one of the walls of the canister 4 or by other suitable means.

A wall of the canister 4, first side wall 6 as shown in FIG. 1, is provided with a first fill tube 18, a second fill tube 20 and a third fill tube 22 which pass through the wall and thus couple the interior of the canister 4 with the exterior.

The first and second membranes 14, 16 are retained within the canister 4 such that they are spaced apart from one another. The space between the first and second membranes 14, 16 defines a component cavity 24. The first membrane 14 also defines a first tool cavity 26 between the first membrane 14 and the top wall 10. The second membrane 16 also defines a second tool cavity 28 between the second membrane 16 and the bottom wall 12.

The first fill tube 18 is fluidically coupled with the first tool cavity 26, the second fill tube 20 is fluidically coupled with the component cavity 24, and the third fill tube 22 is fluidically coupled with the second tool cavity 28.

A method of forming a component using the assembly 2 will now be described with reference to FIGS. 1 to 4.

The component cavity 24 is filled with a metal powder via the second fill tube 20. The first and second tool cavities 26, 28 are filled with a second tool powder via the first fill tube 18 and the third fill tube 22 respectively. Once the cavities have been filled, they are then evacuated and the first, second and third fill tubes 18, 20, 22 sealed. The cavities also may be out-gassed to remove any residual gas in the powder thus preventing contamination. This step of out-gassing may only be required for the component cavity.

The component powder and tool powder are selected such that they have a densification rate which is approximately equal when under isostatic pressing conditions. The densification rates of the powders depend on the flow stresses and yield strengths of the powders, and therefore powders may be chosen which have approximately equal flow stresses and/or yield strengths.

Figure 2:
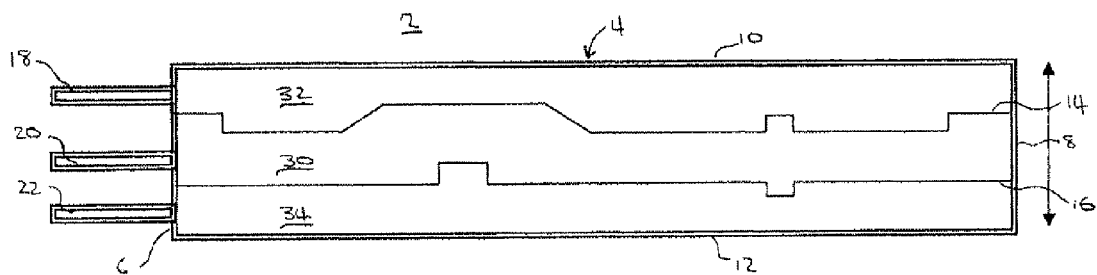
FIG. 2 shows the assembly in a second stage of the method.

As shown in FIG. 2, the canister 4 is then subjected to isostatic pressing, preferably hot isostatic pressing, as described previously. As described previously, the first and second membranes have a profile against which the component powder and also tool powder are compacted and consolidated. Due to the similar densification rates of the component powder and tool powder the powders consolidate evenly and thus the canister collapses evenly. However, a small region near the first and second side walls 6, 8 is distorted (not shown) due to the restraint of the first and second side walls 6, 8. The component powder in the component cavity 24 consolidates to form the component 30 and the tool powder in the first and second tool cavities 26, 28 consolidate to form first and second tools 32, 34.

This even consolidation allows an accurate pre-isostatic pressing powder profile to be determined from a simple proportional extrapolation of the component shape removing the need for complicated 3-D computer modelling. This therefore dramatically reduces the cost per component.

Figure 3:
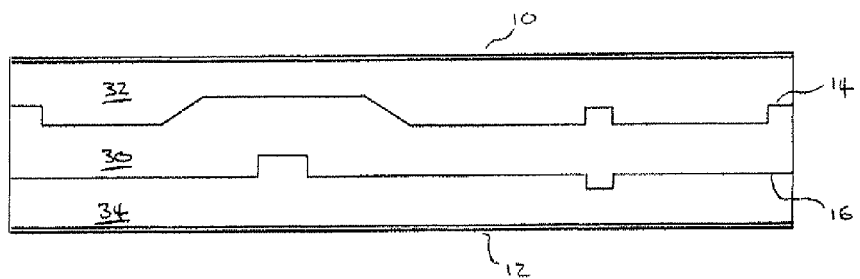
FIG. 3 shows the assembly in a third stage of the method.
Figure 4:
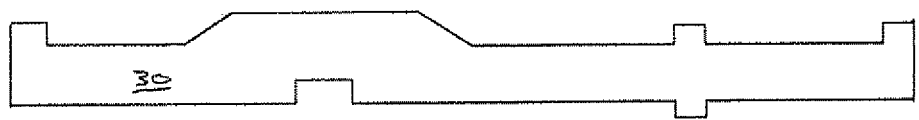
FIG. 4 shows a finished component.

The distorted regions are removed from the component 30 and from the first and second tools 32, 34 as shown in FIG. 3. This may be achieved by machining or by abrasive water jet cutting the distorted regions from the remainder of the consolidated powder. This process also removes the first and second side walls 6, 8 so that the first and second membranes 14, 16 and thus the first and second tools 32, 34 can be removed from the component 30, as shown in FIG. 4.

At least the opposing surfaces of the first and second membranes 14, 16 may be provided with a coating to aid separation of the first and second membranes 14, 16 from the component 30. The coating may be a flash coating of Chromium. Providing the opposing surfaces of the membrane with this coating allows the first and second membranes 14, 16 to be separated from the component 30 without the need for machining or applying an acid solution. This therefore also reduces significantly the cost per component.

Figure 5:
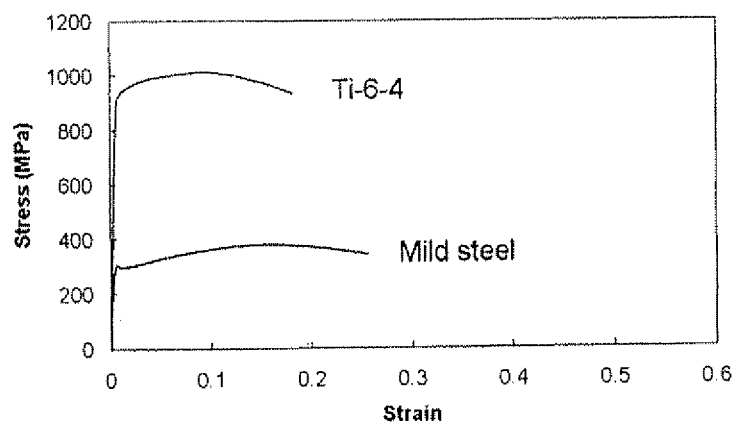
FIG. 5 is a graph of stress against strain for titanium 6-4 and mild steel at room temperature.
Figure 6:
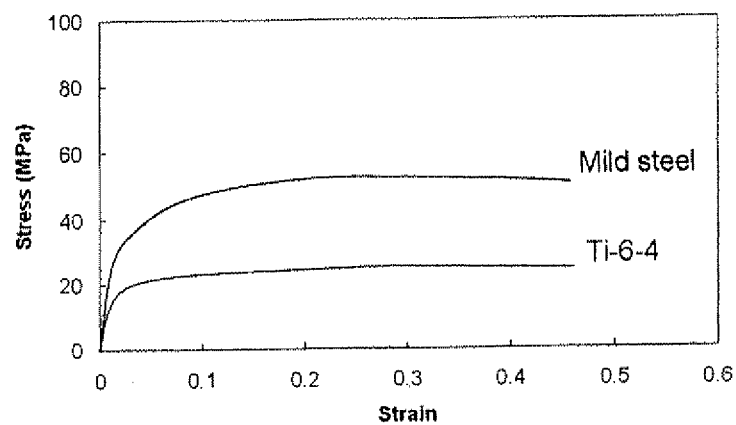
FIG. 6 is a graph of stress against strain for titanium 6-4 and mild steel at 800° C.

A specific example of the invention will now be described with reference to FIGS. 5 and 6. In this example, the component is formed from a titanium powder, such as Ti 6-4, in a mild steel canister. The tool powder is selected to have an approximately equal densification rate as that of the titanium powder and in the illustrated example is a mild steel powder. As described previously, the densification rate depends on the flow stress and yield strength of the powder. As shown in FIGS. 5 and 6, mild steel has a lower strength than Ti 6-4 at room temperature but has a higher strength when at 800° C. Therefore at approximately 750° C. a mild steel powder has an equivalent densification rate to the titanium powder. Therefore the component is hot isostatically pressed at 750° C. and at 150 MPa for approximately two hours before raising the temperature to approximately 930° C. for a further two hours to ensure the powder particles are fully bonded.

If alternative component powders are to be used in this process, suitable tool powders will need to be identified. For example another tool powder will be required for use with nickel alloy component powders, which require a much higher temperature for HIP (~1200° C.).

In an alternative embodiment, the tool powder may be chosen to have a considerably quicker densification rate and thus a lower flow stress and yield strength. As a result, the first and second tools 32, 34 will consolidate earlier than the component powder and will thereafter act to transfer the pressure to the component powder. Although this does not simplify the modelling as much as when powders with approximately equal densification rates are used, it does reduce modelling to just that of consolidating the component powder as there would be no significant influence of the first and second tools 32, 34 on the final shape of the component.

As has been described the invention reduces the complexity of the isostatic pressing process, particularly in determining the pre-isostatic pressing powder profile and in removing the component from the canister. This reduces the cost per product and also the impact on the environment from using acid solutions and from waste production. Advantageously, the invention provides net-shape or near net-shape components at a feasible cost per part.

The invention may be used to form components such as cylindrical compressor casings or structures, although the invention may provide particular advantages in other applications. For simplicity the invention has been shown with a non-cylindrical component, however it should be understood that the invention can be easily applied to cylindrical components.

Although the invention has been described as using a powdered metal, it may find applications where other powdered materials, such as ceramics, are used. In addition, the component powder may be a metal and the tool powder a ceramic or vice versa.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention is further set out in the following numbered paragraphs.

1 A method of forming a component by isostatic pressing, the method comprising:
  providing a canister suitable for isostatic pressing, the canister comprising first and second membranes which, in use, are disposed within the canister;
  the first and second membranes defining a component cavity disposed between the first and second membranes, a first tool cavity disposed between the first membrane and an adjacent wall of the canister, and a second tool cavity disposed between the second membrane and another adjacent wall of the canister;
  filling the component cavity with the component powder for forming the component;
  filling the first and second tool cavities with a second tool powder; and isostatically pressing the canister to form the component.

2 A method as described in paragraph 1, wherein the tool powder has a densification rate which is less than or approximately equal to the densification rate of the component powder 3 A method as described in paragraph 1 or 2, wherein the tool powder has a densification rate which is less than or approximately equal to the densification rate of the component powder when under isostatic pressing conditions.

4 A method as described in paragraph 2 or 3, wherein the densification rates depend on the flow stresses of the powders, such that the tool powder has a flow stress which is less than or approximately equal to the flow stress of the component powder.

5 A method as described in any one of paragraphs 2 to 4, wherein the densification rates depend on the yield strengths of the powders, such that the tool powder has a yield strength which is less than or approximately equal to the yield strength of the component powder.

6 A method as described in any one of the preceding paragraphs, the method further comprising: evacuating and sealing the component cavity and first and second tool cavities prior to isostatically pressing.

7 A method as described in any one of the preceding paragraphs, wherein isostatically pressing the canister comprises hot isostatically pressing.

8 A method as described in paragraph 7, wherein the canister is hot isostatically pressed at a temperature of approximately 750° C. and a pressure of approximately 150 MPa for approximately two hours.

9 A method as described in paragraph 8, wherein the temperature is subsequently raised to approximately 930° C. for approximately a further two hours.

10 A method as described in any one of the preceding paragraphs, wherein following isostatically pressing, the component powder is consolidated to form the component and the tool powder is consolidated to form a first tool in the first tool cavity and a second tool in the second tool cavity, the method further comprising removing the first and second tools and first and second membranes from the component.

11 A method as described in any one of the preceding paragraphs, the method further comprising: removing end portions of the canister, consolidated component and first and second tools.

12 A method as described in paragraph 11, wherein removing the end portions allows the first and second tools and first and second membranes to be removed from the component.

13 A method as described in any one of the preceding paragraphs, the method further comprising: coating a surface of the first and second membranes to aid separation of the membranes from the component following isostatic pressing.

14 An assembly suitable for isostatically pressing a powder to form a component, the assembly comprising:
a canister; and
first and second membranes which, in use, are disposed within the canister;
the first and second membranes defining a component cavity disposed between the first and second membranes, a first tool cavity disposed between the first membrane and an adjacent wall of the canister, and a second tool cavity disposed between the second membrane and another adjacent wall of the canister;
wherein the component cavity receives the component powder for forming the component; and wherein the first and second tool cavities receive a tool powder.

15 An assembly as described in paragraph 14, wherein the tool powder has a densification rate which is less than or approximately equal to the densification rate of the component powder.

16 An assembly as described in paragraph 14 or 15, wherein the tool powder has a densification rate which is less than or approximately equal to the densification rate of the component powder when under isostatic pressing conditions.

17 An assembly as described in paragraph 15 or 16, wherein the densification rates depend on the flow stresses of the powders, such that the tool powder has a flow stress which is less than or approximately equal to the flow stress of the component powder.

18 An assembly as described in any one of paragraphs 15 to 17, wherein the densification rates depend on the yield strengths of the powders, such that the tool powder has a yield strength which is less than or approximately equal to the yield strength of the component powder.

19 An assembly as described in any one of paragraphs 14 to 18, wherein the first and second membranes are located within slots in the canister.

20 An assembly as described in any one of paragraphs 14 to 19, wherein the first and second membranes are provided with a coating to aid separation of the first and second membranes from the component following isostatic pressing.

21 An assembly as described in paragraph 20, wherein the coating is a flash coating of Chromium.

22 An assembly as described in any one of paragraphs 14 to 21, wherein the membrane is a thin nickel plate.

23 An assembly as described in any one of paragraphs 14 to 22, wherein the membrane is electroformed.

24 An assembly as described in any one of paragraphs 14 to 23, wherein the component powder comprises titanium and wherein the tool powder comprises steel.

The invention claimed is:

1. A method of forming a component by isostatic pressing, the method comprising:
providing a canister suitable for isostatic pressing, the canister comprising first and second membranes which, in use, are disposed within the canister;
the first and second membranes defining: i) a component cavity disposed between the first and second membranes, ii) a first tool cavity that is disposed immediately adjacent to the first membrane and immediately adjacent to a wall of the canister, and iii) a second tool cavity that is disposed immediately adjacent to the second membrane and immediately adjacent to another wall of the canister;
filling the component cavity with a component powder for forming the component, the component powder comprising titanium;
filling the first and second tool cavities with a tool powder having a densification rate that is equal to a densification rate of the component powder under an isostatic pressing condition, the tool powder comprising steel; and
isostatically pressing the canister to form the component.

2. A method as claimed in claim 1, wherein the densification rates depend on a flow stress of each of the tool powder and the component powder, such that the flow stress of the tool powder is more than or approximately equal to the flow stress of the component powder.

3. A method as claimed in claim 1, wherein the densification rates depend on a yield strength of each of the tool powder and the component powder, such that the yield strength of the tool powder is more than or approximately equal to the yield strength of the component powder.

4. A method as claimed in claim 1, the method further comprising: evacuating and sealing the component cavity and the first and second tool cavities prior to isostatically pressing.

5. A method as claimed in claim 1, wherein isostatically pressing the canister comprises hot isostatically pressing.

6. A method as claimed in claim 1, wherein following isostatically pressing, the component powder is consolidated to form the component and the tool powder is consolidated to form a first tool in the first tool cavity and a second tool in the second tool cavity, the method further comprising removing the first and second tools and the first and second membranes from the component.

7. A method as claimed in claim 6, the method further comprising: removing end portions of i) the canister, ii) the consolidated component, and iii) the first and second tools.

8. A method as claimed in claim 7, wherein removing the end portions allows the first and second tools and the first and second membranes to be separated from and removed from the component.

9. A method as claimed in claim 1, the method further comprising: coating a surface of the first and second membranes to aid separation of the first and second membranes from the component following isostatic pressing.

10. A method as claimed in claim 1, wherein
the isostatic pressing is applied to the canister in a direction substantially perpendicular to a longitudinal axis defined by a length of the component cavity, and
the tool powder is a different powder than a powder of the component powder.

11. A method as claimed in claim 1, wherein the component powder is one of titanium and steel.

* * * * *